Jan. 10, 1939.   R. D. ACTON   2,143,726
TRACTOR CONSTRUCTION
Filed Sept. 24, 1937   2 Sheets-Sheet 1

Inventor
Russel D. Acton
By [signature]
Att'y.

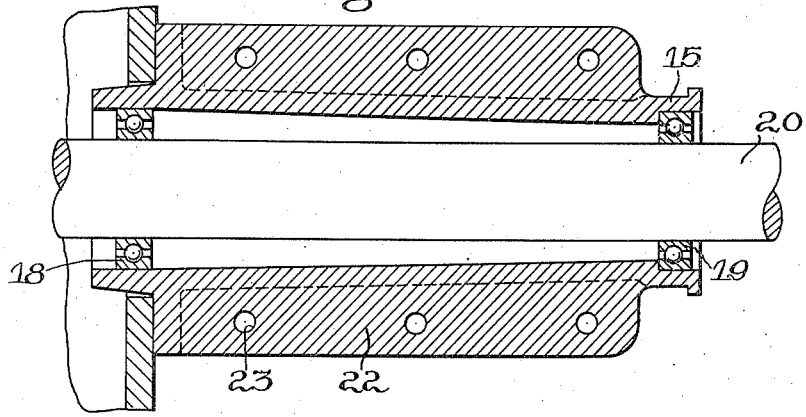
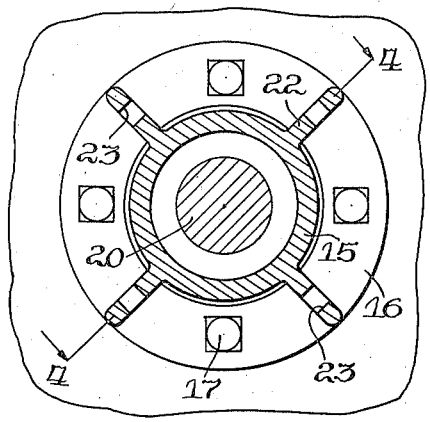
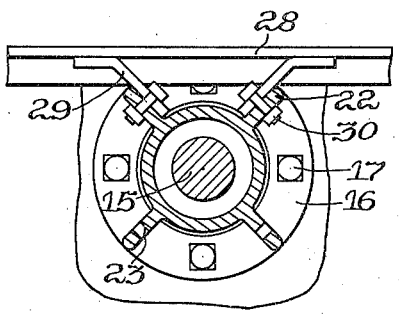
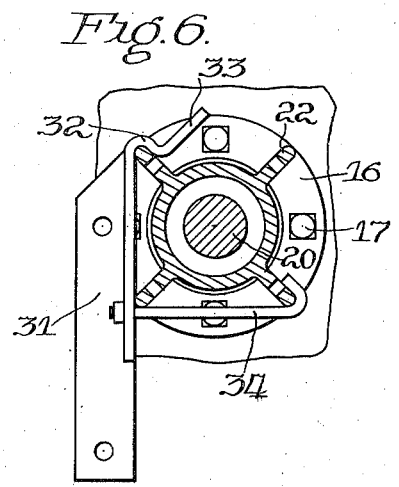
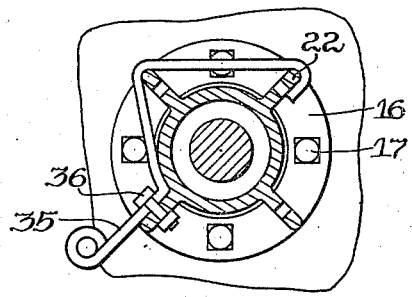
Inventor
Russel D. Acton

Patented Jan. 10, 1939

2,143,726

UNITED STATES PATENT OFFICE 2,143,726

TRACTOR CONSTRUCTION

Russel D. Acton, Chicago, Ill., assignor to International Harvester Company, a corporation of New Jersey Application September 24, 1937, Serial No. 165,465

15 Claims. (Cl. 280—33.44)

This invention relates to farm tractors, and more particularly to features of construction which facilitate the connection and disconnection of supporting frames, draft elements, or other structure to be supported by or attached to the tractor.

The principal object of the invention is to provide a universal coupling structure on a tractor rear axle housing providing for connection therewith of attaching elements at any position around the housing and laterally at any position along the housing. A more specific object is to provide a simple housing structure incorporating attaching portions or sections which strengthen the housing and which may be readily formed thereon or therewith without the addition of auxiliary structure and without additional cost. A more specific object is to position attaching elements or structure on the axle housing of a tractor so as to provide in effect vertical and horizontal attaching faces.

Another object is to provide attaching portions on a tractor axle housing which may be provided with means to effect lateral adjustment along the housing and to lock the attaching or supporting structure in any one of a plurality of positions.

Other objects and advantages will appear in the detailed description to follow.

A preferred embodiment of the invention is illustrated in the drawings, in which:

Figure 3 is a section taken on the line 3—3 of Figure 2;

Figure 4 is a section taken at a 45 degree angle with respect to vertical on the line 4—4 of Figure 4;

Figure 5 is a vertical section through the axle housing substantially the same as the section shown in Figure 3, illustrating the attachment of a horizontal frame structure or platform;

Figure 6 shows another modification of an attaching structure applied in a vertical position; and Figure 7 illustrates another type of attaching structure, which engages alternate attaching flanges and lies in an angular position.

Figure 1:
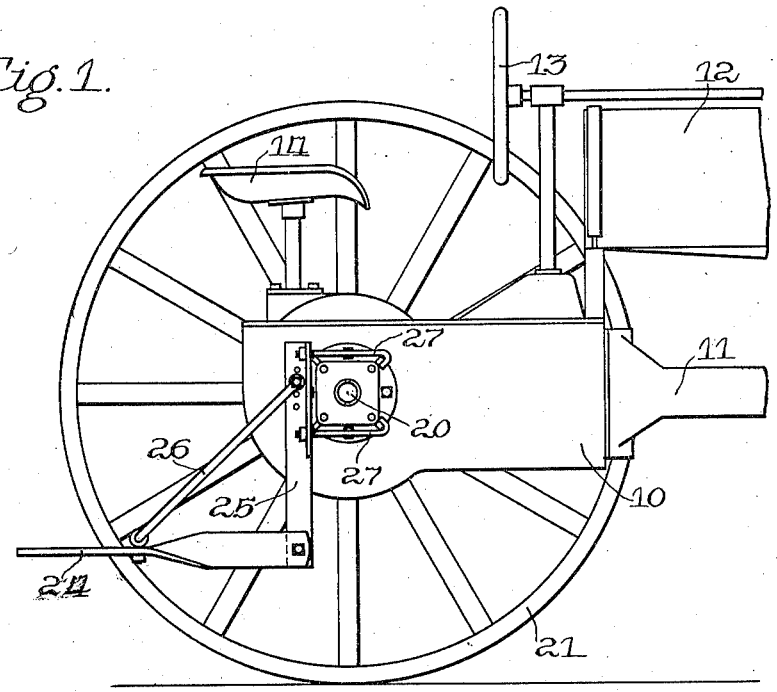
Figure 1 is a side elevation of the rear portion of a farm tractor with one rear wheel removed to better show the connection of a draw-bar structure with a rear axle housing embodying the invention.

In the construction illustrated, the tractor, which is of a conventional farm type, has an oblong shaped transmission and differential casing 10. The front frame members 11 of the tractor are shown as being attached to the casing 10. A fuel tank 12, a steering gear 13, and an operator's seat 14 are also illustrated in Figure 1.

At each side of the transmission casing 10, at the rear end thereof, alined, tubular, axle housings 15 are secured by means of flanges 16 at their ends adjacent the casing 10. The flanges are secured by a plurality of bolts 17. Said housings are formed interiorly to provide for carrying ball-bearing assemblies 18 and 19, which support the axle shafts 20. Drive wheels 21, only one of which is shown, are mounted on the axles 20.

Each axle housing 15 consists essentially of a tubular center portion and the flange 16 by which it is attached to the casing 10. There is also an enlarged portion 21 at the outer end of each housing to provide a recess for supporting the bearing assembly 19.

To provide coupling means for attaching implement supporting members or brackets, or other frame structure to be mounted on or carried by the tractor, a plurality of elements 22 in the form of ribs cast integrally with the axle housing are located at equally spaced positions around the axle housing. In the preferred construction, as shown in the drawings, the ribs are positioned at 90 degree intervals, there being four ribs. The ribs are also positioned at substantially 45 degrees with respect to the vertical or horizontal, and extend radially outwardly from the center of the housing. It will be understood that the housing and ribs may be of different shape, the important feature being that a plurality of ribs are utilized and that the outward edges of adjacent ribs form in effect surfaces across which attaching members or structure may be fitted.

Figure 2:
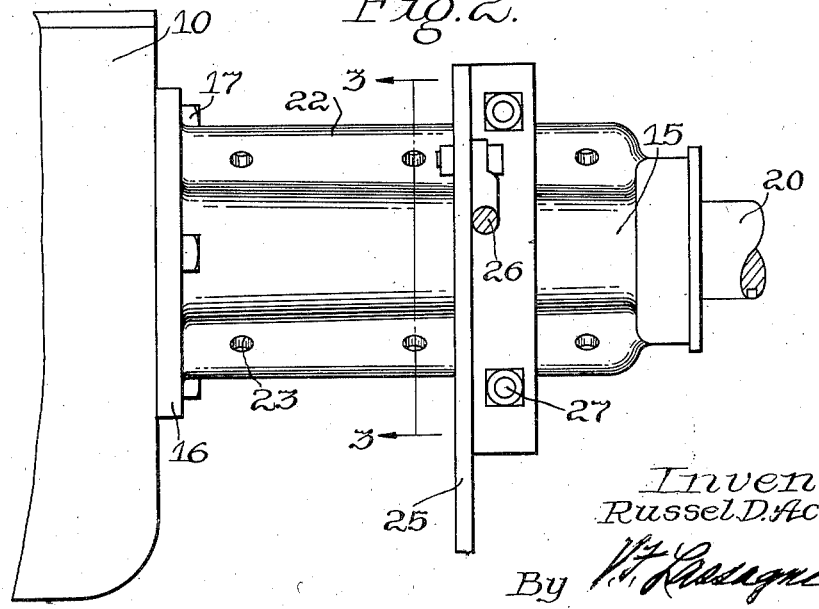
Figure 2 is a rear view on an enlarged scale of the rear axle housing shown in Figure 1.

It will be noted by reference to Figures 2 and 4 that the ribs 22 extend the entire length of the housing from the flange 16 to the enlarged portion 21. This provides a universal coupling means insofar as lateral adjustment may be desired. To provide for positive locking against movement in an axial direction along the ribs 22, a number of spaced openings 23 are formed in the ribs 22. Any desired number of these openings may be provided with any desired spacing. Also, the ribs 22 form structural elements which brace the housing structure and reduce the amount of metal needed in the central tubular portion. The openings 23 do not weaken the ribs sufficiently to materially reduce their structural strength.

Figure 1 shows an attaching draw-bar structure with one type of attaching elements which may be utilized on applicant's improved axle structure. A U-shaped draw-bar 24 is connected to vertical upright members 25. Links 26 connect the draw-bar at rearwardly located points to the members 25 at points adjacent the upper ends thereof. The members 25 are in the form of angle bars with one face fitted against the two ribs 22, which extend rearwardly. Attaching elements in the form of hook bolts 27 provide means for rigidly and removably attaching the members 25 to the axle housing. The upper bolt extends across the two ribs 22, which extend upwardly, and hooks over the forward rib. The lower bolt is positioned in a corresponding manner. By tightening the nuts on the bolts 27, the draw-bar structure is rigidly secured to the axle housings. It will be understood that, by means of the construction utilizing hook bolts illustrated for connecting the draw-bar structure, attaching structures may be positioned around the axle housing at any position; that is, at either side and above and below the housing. In this respect, the axle housing provides a universal attaching means. It is also understood that the draw-bar structure as illustrated may be shifted laterally on the axle housing from any position adjacent the flange 16 to the outer end adjacent the enlarged portion 21.

Figure 5 shows a modification for attaching a frame structure to the ribs 22. To illustrate this modification, only an angle bar 28 has been illustrated. Said bar is provided with two attaching brackets 29, shaped to fit against two adjacent ribs 22. Bolts 30 are provided for rigidly securing the brackets 29 to the ribs 22. This attaching means may also be applied below the axle housing or vertically at either side thereof.

Figure 6 shows another modification in which only one securing element is utilized. An attaching member in the form of an angle bar 31 is illustrated as being provided with a hook portion 32 at the upper end. Said hook portion engages one of the ribs 22. Beyond the hook portion a guide portion 33 is illustrated, which is bent away to form a cam surface. This construction may be utilized for implements to facilitate connecting the attaching member, as the cam action of the portion 33 may be utilized to guide the hook portion 32 into engaging position. A hook bolt 34 constitutes the only securing element for this type of attaching member.

Figure 7 shows another modification in which an attaching member 35 is formed to hook over one rib 22 and to engage another of the ribs positioned diametrically opposite the first rib. A bolt 36 is illustrated for connecting the attaching member 35 rigidly to the axle housing. It is to be understood that all of the attaching members may be moved axially of the housing. Those which engage the ribs only may be secured at any point along the housing. Those which are provided with securing elements, which pass through the openings formed in the ribs 23 may be secured at any location where an opening is provided.

The operation of applicant's improved coupling means for tractors has been explained in connection with the description of the different types of attaching structures which can be applied thereto. The universal location around the axle housing and axially with respect to the housing has also been referred to in connection with each of the modifications illustrated. It is to be understood that applicant has shown and described only a preferred embodiment of his invention as incorporated in a cast axle housing and that he claims as his invention all modifications falling within the scope of the appended claims.

What is claimed is:

1. In a tractor construction, the combination with a transverse axle structure, of circumferentially spaced ribs connected to the structure and extending outwardly therefrom, said ribs extending lengthwise of the structure forming thereby attaching means for a laterally adjustable supporting bracket.

2. In a tractor construction, the combination with a transverse axle structure, of circumferentially spaced ribs connected to the structure and extending outwardly therefrom, said ribs extending a substantial distance lengthwise of the structure forming thereby attaching means, and a laterally adjustable supporting bracket abutting said ribs and rearwardly secured thereagainst.

3. In a tractor construction, the combination with a transverse axle structure of at least three circumferentially spaced ribs connected to the structure and extending outwardly therefrom, said ribs extending a substantial distance lengthwise of the structure and forming a plurality of attaching faces for supporting brackets.

4. In a tractor construction, the combination with a transverse axle structure and four circumferentially spaced ribs connected to the structure and extending outwardly therefrom, said ribs extending a substantial distance lengthwise of the structure, and a supporting bracket abutting two of said ribs and secured to the axle structure.

5. In a tractor construction, the combination with a transverse axle structure, of four circumferentially spaced ribs connected to the structure and extending outwardly therefrom, said ribs extending a substantial distance lengthwise of the structure at such an angle as to provide a plurality of attaching faces arranged at right angles to each other.

6. In a tractor construction, the combination with a transverse axle structure, of four circumferentially spaced ribs connected to the structure and extending outwardly therefrom, said ribs extending a substantial distance lengthwise of the structure at such an angle as to provide a plurality of attaching faces arranged at right angles to each other, and a supporting bracket abutting one of said faces and secured to the axle structure.

7. In a tractor construction, the combination with a transverse axle structure, of spaced ribs connected to the structure and extending outwardly therefrom, said ribs extending a substantial distance lengthwise of the structure at an angle with respect to horizontal forming thereby an attaching face, and said ribs being provided with a series of spaced openings, a supporting bracket abutting said face, and means engaging the ribs around the opening for securing said bracket thereto.

8. In a tractor construction, a rear axle housing adapted to provide means for the quick attachment of supporting brackets, comprising a transverse axle structure and two circumferentially spaced ribs connected to the structure and extending outwardly therefrom, said ribs extending a substantial distance lengthwise of the structure, a supporting bracket having a hooked end portion engaging one rib, and means for securing the bracket to another rib.

9. In a tractor construction, a rear axle housing adapted to provide means for the quick attachment of implement supporting brackets comprising a tubular axle housing and spaced ribs connected to the housing and extending radially outwardly therefrom, said ribs extending a substantial distance lengthwise of the housing at an angle with respect to horizontal whereby two adjacent ribs are adapted to form an attaching face for an implement supporting bracket positioned vertically at the front and rear of the housing and horizontally above and below the housing.

10. In a tractor construction, a rear axle housing adapted to provide means for the quick attachment of implement supporting brackets comprising a tubular axle housing and four equally spaced ribs connected to the housing and extending radially outwardly therefrom, said ribs extending a substantial distance lengthwise of the housing and being positioned at substantially 45 degrees with respect to horizontal, whereby two adjacent ribs form an attaching face for an implement supporting bracket positioned vertically at the front and rear of the housing and horizontally above and below the housing.

11. In a tractor construction, a rear axle housing formed with a central tubular portion and two spaced integral ribs extending radially from the tubular portion at substantially 45 degrees with respect to horizontal and lengthwise of the axle housing, whereby attaching brackets may be fitted against the ribs at laterally spaced positions.

12. In a tractor construction, a rear axle housing adapted to provide means for the quick attachment of implement supporting brackets comprising a tubular axle housing and a plurality of spaced ribs connected to the housing and extending radially outwardly therefrom, said ribs extending lengthwise of the housing, whereby two adjacent ribs form an attaching face for an implement supporting bracket, said ribs being provided with spaced openings for the connection of bracket securing elements.

13. In a tractor construction, a rear axle housing formed with a central tubular portion and two spaced integral ribs extending radially from the tubular portion at substantially diametrically located positions and lengthwise of the axle housing, whereby attaching brackets may be fitted against the ribs at laterally spaced positions.

14. In a tractor construction, the combination with a drive shaft housing structure, of circumferentially spaced ribs connected to the structure and extending outwardly therefrom, said ribs being substantially parallel and extending lengthwise of the structure forming thereby attaching means, and a supporting bracket abutting said ribs and removably secured thereagainst for lateral adjustment along the ribs.

15. In a tractor construction, the combination with a tubular housing structure, of spaced ribs connected to the structure and extending outwardly therefrom, said ribs being substantially parallel and extending lengthwise of the structure forming thereby attaching means, and a supporting bracket abutting said ribs and removably secured thereagainst for lateral adjustment along the ribs.

RUSSEL D. ACTON.